United States Patent [19]
Reichmann

[11] Patent Number: 5,585,429
[45] Date of Patent: Dec. 17, 1996

[54] POLYPHTHALAMIDE RESIN FORMULATIONS

[75] Inventor: Mark G. Reichmann, Roswell, Ga.

[73] Assignee: Amoco Corporation, Chicago, Ill.

[21] Appl. No.: 410,816

[22] Filed: Mar. 27, 1995

[51] Int. Cl.⁶ .................................. C08J 3/20; C08K 3/16
[52] U.S. Cl. ......................... 524/401; 528/335; 528/336; 525/437
[58] Field of Search .................................. 528/335, 336; 525/437; 524/401

[56] References Cited

FOREIGN PATENT DOCUMENTS 6-001840  1/1994  Japan .

*Primary Examiner*—Samuel A. Acquah
*Attorney, Agent, or Firm*—Richard J. Schlott; Stephen L. Hensley

[57] ABSTRACT

Polyphthalamide formulations containing from 0.1 to about 2 wt % alkali metal halide have a significantly reduced melt viscosity and both filled and unfilled resin formulations containing the requisite amount of alkali metal halide are more readily processed by thermal means. When stabilized with a copper-containing stabilizer and, optionally, a polyolefin synergist the formulations exhibit substantially improved dry heat stability and are particularly useful in the production of thermally-stabilized melt spun polyphthalamide fiber for applications where extended exposure to elevated temperatures in air is contemplated.

8 Claims, No Drawings

POLYPHTHALAMIDE RESIN FORMULATIONS

BACKGROUND OF THE INVENTION

This invention relates to polyphthalamide resin formulations having improved processing characteristics, more particularly to polyphthalamide resin formulations with reduced melt viscosities and to a method for lowering the melt viscosity of polyphthalamide resins.

Polyphthalamides generally exhibit a balance of thermal, strength and stiffness properties which make them suitable for many applications, and the resins may be particularly attractive for use where resistance to chemical and thermal attack is required. Polyphthalamide resins such as crystalline and semi-crystalline copolyphthalamides comprising at least about 50 mole percent aliphatic terephthalamide units are known for their particularly good thermal properties, and these resins have found acceptance for use where high temperature properties are desired. However, such polyphthalamides may have relatively high melting points, e.g. about 290° C. or higher, and high melt viscosities, with degradation temperatures not greatly exceeding their melting points; accordingly, requirements for successful melt processing of these polyphthalamides are quite rigorous and complex. These high melt viscosity resins are particularly difficult to process into filaments. For example, conventional melt spinning operations place severe thermal stresses on high melt viscosity resins. The extruding of complex profiles and tube and pipe extrusion are also operations that may require placing high melt viscosity resins under thermal stress at high shear, particularly when using filled resins. In injection molding operations, successful filling of the mold, particularly where large or complex parts are molded, requires that the resin viscosity be reduced, which conventionally is accomplished by using heated molds and high stock and die temperatures. When fabricated in such operations resin degradation may become a serious problem, thus limiting the acceptability of polyphthalamides for many applications.

By contrast, most of the well-known aliphatic polyamides melt at lower temperatures, and the melt stability of these resins is quite adequate for thermal processing. For example, hexamethylene adipamide or nylon 66 melts at about 260°–265° C. and has a low melt viscosity, and thus is generally much more easily processed thermally than the high melting polyphthalamide resins. In some instances, aliphatic polyamides may even have unacceptably low melt viscosities and be difficult to thermally process, particularly where hot melt strength is needed such as in conducting melt spinning and extrusion operations. The use of additives or processing aids that will increase the melt viscosity of such resins to a level more optimum for melt processing has been proposed in the art.

Methods for lowering the melt viscosity of polyphthalamide resins are thus needed to improve the processability of these resins and to afford wider commercial acceptance, particularly where melt spinning of fiber is contemplated.

Polyamide fiber, including yarn and filament, is generally produced by melt spinning using processes well known and described in the art. In most such melt spinning operations, filtration means such as sand packs are conventionally employed to remove particulates including gel and other degradation products that would weaken the fiber. High melt viscosity may impede resin flow through such devices and cause substantial increase in back pressure, subjecting the resin to additional thermal stresses and further adding to the difficulty of spinning and extruding such resins.

The art of stabilizing resins against deterioration through exposure to thermal oxidative environments is well developed, and numerous additives are known for improving the thermal oxidative resistance of aliphatic polyamides, both during processing and while in use. However, because high temperature resins such as polyphthalamides require processing at temperatures very near the decomposition temperature, achieving adequate stabilization in these resins is more difficult than for aliphatic nylons.

The art thus continues to need better methods for avoiding thermal degradation of high temperature resins such as polyphthalamides. While a great many stabilizer packages have been disclosed in the art for these purposes, less effort has gone into reducing the mechanical and thermal stresses placed on the resin during thermal processing, particularly in melt spinning. A method for lowering the melt viscosity of polyphthalamide resins would provide an important advance in the art, allowing rapid processing of the resin and with lower shear, and may permit the use of lower processing temperatures.

BRIEF SUMMARY OF THE INVENTION

This invention is directed to a method for lowering the melt viscosity of polyphthalamide resins wherein the polyphthalamide is compounded with an alkali metal halide prior to melt processing, and to polyphthalamide resin formulations having a lower melt viscosity at the temperatures normally encountered in melt processing operations. The invention is also directed to polyphthalamide compositions containing an amount of an alkali metal halide sufficient to reduce the melt viscosity of the polyphthalamide.

Polyphthalamide formulations according to the teachings of this invention are particularly useful in producing filament and yarn and, when stabilized by including otherwise conventional thermal stabilizers, the formulations exhibit improved thermal stability. The invention thus also contemplates stabilized compositions comprising a polyphthalamide, particular stabilizers and an alkali metal halide which are particularly suited for melt spinning polyphthalamide filaments, and polyphthalamide filaments comprising such formulations having improved thermal stability which may be particularly desirable for use in applications where extended exposure to heat is contemplated.

DETAILED DESCRIPTION OF THE INVENTION

The polyphthalamide formulations of this invention comprise a polyphthalamide and an amount of an alkali metal salt sufficient to reduce the melt viscosity.

The polyphthalamides useful in the practice of the invention include the various linear, high temperature polyphthalamides and aromatic-aliphatic copolymer analogs thereof that require high processing temperatures and are thus difficult to melt process without deterioration. Particularly preferred are the crystalline or semi-crystalline high temperature copolyphthalamides comprising terephthalamides of aliphatic diamines as well as further copolymers thereof containing additional diamide moieties. Preferred copolymers include those containing at least 50 mole % of the terephthalamide units, together with at least one additional diamide of an aliphatic diamine. The aliphatic diamine component of the polyphthalamide may be one or more acyclic or cycloaliphatic $C_2$–$C_{12}$ aliphatic diamines such as hexamethylene diamine or the like, including such diamines having one or more $C_1$–$C_4$ alkyl substituents attached to the hydrocarbon portion thereof. For copolyphthalamides, the additional diamide component will be selected from aromatic diamides such as an isophthalamide, a naphthalene dicarboxylic acid diamide or the like, and $C_4$–$C_{12}$ acyclic or cycloaliphatic carboxylic diamides such as adipamide, sebacamide, cyclohexane dicarboxylic acid diamide or the like.

In greater detail, the polyphthalamide component of the invented compositions is a crystallizable polyamide comprising at least about 50 mole percent recurring aliphatic diamine terephthalamide units which may be further described as represented by the formula

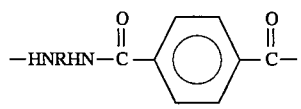

wherein R comprises at least one aliphatic hydrocarbyl radical.

Preferably, aliphatic radicals R in the above formula comprise at least one straight chain, branched or cyclic, substituted or unsubstituted aliphatic radical having from about 4 to about 14 carbon atoms. These radicals are preferred because polyphthalamides comprising the same exhibit good crystallinity and desirable high temperature properties, together with melting and thermal degradation temperatures making them well suited for melt processing with the modifying components of the invented compositions. Specific examples of suitable aliphatic radicals include tetramethylene, hexamethylene, dodecamethylene and the like, as well as their alkyl-substituted analogs such as 2-methylpentamethylene, 2,4-dimethylhexamethylene 2,2,4-trimethylhexamethylene and the like, and cyclic analogs such as p-cyclohexyl and the like. Most preferably, R in the formula comprises a hexamethylene radical, either alone or as a mixture with additional aliphatic 4 to 14 carbon atom radicals.

The polyphthalamide component has a melting point of at least about 270° C. as a result of its high content of terephthalamide units. Preferred polyphthalamide components are those melting at about 290° C. to about 330° C. because the same exhibit particularly desirable thermal properties and are more easily processed than higher melting polyphthalamides.

The polyphthalamide component of the invented compositions also can comprise a portion of recurring units as described above but wherein radicals R are replaced with one or more other types of divalent hydrocarbyl radicals, e.g. substituted or unsubstituted aromatic radicals. Specific examples of such other radicals include m-phenylene, p-phenylene, m-xylylene, p-xylylene, oxybis-phenylene and methylenebisphenylene. When such other radicals are present, the proportion thereof should not be so great as to adversely affect desirable properties of the polyphthalamide component, such as strength, thermal properties and melt processability. Preferably, not greater than about 30 mole percent of the recurring units of the polyphthalamide comprises such other radicals.

The polyphthalamide may further comprise, in addition to the terephthalamide units represented by the formula above, one or more other carbonamide units including aliphatic diamide units such as, for example, hexamethylene adipamide, hexamethylene sebacamide, hexamethylene azeleamide, hexamethylene dodecamethylamide, hexamethylene cyclohexanedicarboxy-1amide, dodecamethylene adipamide, and units derived from lactams such as caprolactam; aromatic diamide units such as m-xylylene isophthalamide, p-xylylene isophthalamide, oxybisphenylene isophthalamide or the like; and aliphatic-aromatic diamide units such as, for example, hexamethylene isophthalamide, hexamethylene 2,6-naphthalene dicarboxylamide, m-xylylene adipamide, heptamethylene isophthalamide, dodecamethylene isophthalamide, m-phenylene adipamide or the like. Preferred among such additional carbonamide units are hexamethylene adipamide, hexamethylene isophthalamide and caprolactam units and combinations thereof.

Proportions of such other carbonamide units in the polyphthalamide compositions should not be such as to adversely affect processability or desirable properties of the invented compositions. Generally, at least about 50 mole percent of the carbonamide moieties of the polyphthalamide composition is provided by aliphatic diamine terephthalamide units corresponding to the formula above to assure crystallinity and desirable strength and thermal properties. More preferably, about 55 to about 90 mole % of such moieties are provided by such units to achieve good properties and ensure melt processing compatibility of the polyphthalamide component and the modifying component.

A preferred polyphthalamide component of the invented compositions comprises a semicrystalline polyphthalamide of fast or intermediate crystallization rate comprising recurring units corresponding to formulas A, B and C below in proportions of about 50 to about 100 mole percent A, 0 to about 35 mole percent B and about 0 to about 50 mole percent C.

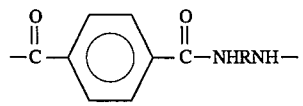 A

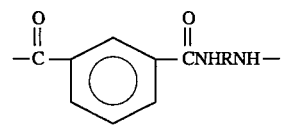 B

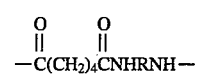 C

In the above formulas, R is as described hereinabove, with hexamethylene being most preferred. Also as described above, R may represent a mixture of aliphatic 4 to 14 carbon atom radicals.

Particularly preferred among such polyphthalamides are those polyphthalamides having melting points of about 300° to about 350° C., a glass transition temperature (Tg) of about 90° to about 130° C. and inherent viscosities generally ranging from about 0.75 to about 1.4 dl/g, with about 0.9 to about 1.25 dl/g being preferred from the standpoint of properties of molded parts and ease of molding. A number of suitable polyphthalamides are well known and described in the art, including those comprising the units A, B and C in mole ratios of 55:5:45, 65:25:10, 60:30:10, and 55:35:10, and many such polyphthalamides may be available from commercial sources. Especially preferred among such polyphthalamides are those wherein R in the above formulas comprises hexamethylene. Polyphthalamides comprising at least two of the units A, B and C shown above, such as, for example, those having such units in mole ratios of 65:35:0, 50:0:50, 55:0:45, 60:0:40, and 75:0:25, are also known in the art and these polyphthalamides may also be suitable for the purposes of this invention. Also suitable for use in the invented compositions are polyphthalamides based on terephthalic acid and isophthalic acid compounds in a mole ratio of about 70–99:30–1, particularly those wherein the diamine component comprises hexamethylene diamine.

Although the molecular weight of the polyphthalamide is not particularly important to the practice of the invention, for the purposes of fiber and filament use generally, fiber grade polyphthalamides will be preferred. Such resins may be further described as having inherent viscosities greater than about 0.7, preferably greater than about 0.8, when measured at 30° C. in a 60/40 phenol/tetrachloroethylene (TCE) mixture at a concentration of 0.4 g/dl. Although there is no particular upper limit for the molecular weight of the polyphthalamide component to be suitable for use in these compositions the resin must be melt processable. Very high molecular weight polyphthalamides, those with an inherent viscosity much above about 1.5 to as as great as 2.0 or greater, may be extremely difficult to process thermally in a melt spinning operation even when combined with alkali metal salts according to the invention, hence such resins will not be preferred.

Polyphthalamides generally regarded as particularly desirable for many high temperature uses are crystalline or crystallizable. A variety of polyphthalamides comprising terephthalamide units are known in the art for these purposes, and crystalline and semicrystalline copolyphthalamides comprising a combination of hexamethylene terephthalamide units and hexamethylene adipamide units, optionally including hexamethylene isophthalamide units, are also well-known. Particularly desirable for the purposes of the invention are copolyphthalamides comprising at least 50 mole % hexamethylene terephthalamide units, the balance being hexamethylene adipamide units or a mixture thereof with up to about 30 mole % hexamethylene isophthalamide units. Also useful are the well known crystallizable polyphthalamides comprising 2-methyl-1,5-pentamethylene terephthalamide units, ordinarily in combination with one or more additional aliphatic terephthalamide units such as, for example, hexamethylene terephthalamide. A variety of copolyphthalamides including those described herein as preferred are readily available from commercial sources, and methods for their preparation are also fully described in the art, for example, in U.S. Pat. Nos. 4,603,166 and 4,831,108, 5,112,685 and 4,163,101 and in European Patent Application 309,095; the teachings of these patents and applications are hereby incorporated herein by reference.

The alkali metal salt employed to reduce the melt viscosity of polyphthalamides according to the invention will preferably be selected from the group consisting of alkali metal halides, and more preferably will be selected from the chloride, bromide and iodide salts thereof. Lithium chloride and lithium bromide will be particularly preferred for use in combination with polyphthalamides for formulations that will be fabricated using melt processing operations. Lithium chloride, lithium bromide, sodium chloride, sodium bromide or sodium iodide may be found to be particularly useful in combination with thermal stabilizers such as the well-known copper iodide/potassium iodide thermal stabilizers for providing thermally-stabilized polyphthalamide formulations for filament and yarn applications. It will be understood that other salts of alkali metals may also prove effective in combination with polyphthalamides and these may be employed in the practice of this invention. However, those skilled in the art will recognize that some alkali metal salts such as, for example, certain fluoride salts may be highly toxic, and that others such as carbonates, sulfites, acetates and the like may be unstable and decompose during processing or otherwise undergo reactions that may be detrimental to the polymeric components or the properties of the resulting compostions; such salts thus will not be preferred.

Generally, the polyphthalamide formulations of this invention will comprise from about 0.2 to about 2.0 wt % of the alkali metal salt, based on the combined weight of polyphthalamide and salt. Although greater amounts of the salt may also be effective in reducing melt viscosity, generally the greatest effect will occur within the range of from 0.5 to about 1 wt %, with little further reduction in viscosity ordinarily observed at levels above about 2 wt %. At levels below about 0.2 wt % the effect on viscosity will become vanishingly small, hence these lesser amounts will not be preferred. Addition of an alkali metal halide to a polyphthalamide resin within these ranges will be observed to reduce the melt viscosity of the formulation by from 25% to as much as 60% over the melt viscosity of the neat polyphthalamide resin, when compared at the same temperature and shear rate. The effect on viscosity will be most pronounced at low shear rates, generally at rates of from 50 to 100 sec-1, where the observed melt viscosity will be high.

The reduction in melt viscosity produced by the addition of the alkali metal salt will also be observed by measuring the increase in pack pressure for melt spinning operations. Generally, for neat polyphthalamide resins the pack pressure will be observed to double in about two hours of spinning; for compositions containing the alkali metal salt, only about a 10% increase in the pack pressure occurred after two hours.

For many uses the polyphthalamide in fiber form may be subjected to further thermal processing such as by drawing operations usually conducted at elevated temperatures in order to develop crystallinity in the fiber. Filament and yarn that will be used in industrial fiber applications such as drier felts and the like must also be capable of withstanding extended exposure to elevated temperature environments. Good thermal stability is therefore critically important to attaining good properties.

The art of stabilizing resins against deterioration through exposure to thermal oxidative environments is well developed. Numerous additives have been proposed for improving the thermal oxidative resistance of polyamides, both during processing and while in use. For example, the short-term thermal stability needed for most processing may be realized by employing polyamide formulations comprising hindered phenolic antioxidants such as di-tertiary butyl cresol and derivatives. It also is important for industrial yarn applications and similar uses where the yarn will undergo extended exposure to oxidative environments that the additives retain their effectiveness after processing.

Stabilizer compositions comprising copper (I) halide and an alkali metal halide are described in the art for use with polyamides; the use of complex compounds comprising copper salts and diamines has also been disclosed for use with polyamide filaments. Dispersions of solid cuprous phthalate and potassium iodide have been used at levels corresponding to ca. 60 ppm copper to stabilize nylon 6,6 filaments comprising nylon 6,6 and copolymers comprising minor amounts of hexamethylene isophthalamide. Inasmuch as the copper component of these stabilizers is a solid, the stabilizers will be employed at low levels, and will be thoroughly dispersed in the resin to minimize loss in fiber strength. Heat stabilizers comprising combinations of copper halides, alkali metal halides and phosphorus compounds have been employed for use in polyamide molding resins and the like.

Formulations according to the invention may have improved thermal stability when compared with the neat polyphthalamide. When used in combination with copper containing stabilizers, the dry heat stability of filaments comprising a polyphthalamide and an alkali metal salt is substantially improved over copper stabilized compositions without the added alkali metal salt. Among the copper-containing stabilizers known in the art and widely used in stabilizing polyamides, those comprising a copper (I) iodide and potassium are particularly useful for providing polyphthalamides with dry heat stability. The amount of the stabilizer used generally will be selected to provide a level of from about 50 to about 1000 ppm copper, preferably employing copper (I) iodide and potassium iodide at a weight ratio the range of from about 2.5 to about 10, and most preferably from about 8 to about 10. Generally, the combined weight of copper compound and potassium iodide in the stabilized polyamide filament will amount to from about 0.01 to about 2.5 wt %, preferably from about 0.1 to about 1.5 wt %, based on the combined weight of polyphthalamide and stabilizers. The addition of an alkali halide at levels of from 0.2 to about 2 wt % to these stabilized formulations is found to enhance the thermal stability of the formulation.

The invented polyphthalamide formulations may be formed into fibers, yarns, film, sheets or other forms using any of a variety of processes and methods well-known and widely practiced in the fabricating arts, e.g. the melt spinning of fibers, the extrusion of sheets or films and the like, or may be used as matrix materials or binders in combination with conventional reinforcing fiber and fillers for composite or laminated structures or in providing filled molding resin formulations with improved melt processing characteristics.

The present invention is described further in connection with the following examples, it being understood that the same are for purposes of illustration and not limitation.

EXAMPLES

The following materials and formulations are employed in the Examples.

PPA-1: Hexamethylene terephthalamide-isophthalamide-adipamide terpolymer, mole ratio 65:25:10, inherent viscosity of 0.85 dl/g determined at 30° C. in a 60/40 phenol/TCE mixture at a concentration of 0.4 g/dl.

PPA-2: Hexamethylene terephthalamide-adipamide copolymer, mole ratio 65:35, inherent viscosity of 0.97 dl/g determined at 30° C. in a 60/40 phenol/TCE mixture at a concentration of 0.4 g/dl.

PPA-3: Hexamethylene terephthalamide-isophthalamide-adipamide copolymer, mole ratio 50:5:45, inherent viscosity of 0.92 dl/g determined at 30° C. in a 60/40 phenol/TCE mixture at a concentration of 0.4 g/dl.

The processes and methods of the following Examples will be generally recognized by those skilled in the art as processes and methods commonly employed for extrusion compounding and injection molding operations and for melt spinning filament and yarn. The specimens of commercial resins used as controls were prepared and tested using substantially the same processes and conditions employed for the examples according to the invention; the test results may vary from published data for commercial materials processed in different equipment under dissimilar processing conditions.

Examples 1–4 and Comparison Example A.

The formulations are summarized in Table I. Dry blends of Polyphthalamide I together with the indicated amounts of lithium bromide were extrusion compounded using a 1 inch, ZSK-30 twin-screw extruder fitted with a medium compression ratio mixing screw at a screw speed of 300 rpm. The extruder zone temperatures during the extrusion ranged generally from 260° to about 335° C., with a melt temperature of about 319° C. and a die temperature of 320° C. The throughput was 30 lbs/hr. Cooled strand extrudate was collected and used in rheology testing.

Melt viscosity data were obtained using a Kayeness rheometer over a range of shear rates from 50 $sec^{-1}$ to 2500 $sec^{-1}$. The melt time was set at 300 seconds, using a 325° C. test temperature.

The compositions and test data are summarized in Table I.

TABLE I

| Ex. No. | salt (wt %) | I.V.* initial | I.V.* final | melt viscosity (poise), measured at shear rate | | | | |
|---|---|---|---|---|---|---|---|---|
| | | | | 50 $sec^{-1}$ | 100 $sec^{-1}$ | 500 $sec^{-1}$ | 1000 $sec^{-1}$ | 2500 $sec^{-1}$ |
| A | none | 0.90 | 1.02 | 28,151 | 16,246 | 5,736 | 3,787 | 2,112 |
| 1 | LiBr (0.1) | 0.96 | 1.07 | 27,516 | 15,447 | 5,663 | 3,707 | 2,124 |
| 2 | LiBr (0.2) | 0.91 | 1.02 | 22,757 | 13,711 | 4,887 | 3,363 | 1,973 |
| 3 | LiBr (0.5) | 0.90 | 0.98 | 17,362 | 10,549 | 4,183 | 2,871 | 1,743 |
| 4 | LiCl (0.5) | 0.89 | 0.96 | 16,804 | 9,991 | 4,020 | 2,760 | 1,672 |

Notes:
*I.V.= intrinsic viscosity, measured before and after rheology testing.

It will be apparent that as little as 0.1 to 0.2 wt % lithium halide will reduce the melt viscosity of the polyphthalamide resin by as much as 20% when measured at 325° C. and at low shear (50 to 100 $sec^{-1}$). For formulations containing 0.5 wt % the reduction in melt viscosity is even more substantial, on the order of about 40%, again when measured at low shear rates.

The addition of lithium chloride or lithium bromide to an aliphatic nylon such as nylon 6 is known to depress the melting point. However, at levels of from 2 to 4 wt % alkali metal halide the melt viscosity of such aliphatic polyamides is increased. The addition of lithium chloride has been disclosed in the art to increase the melt viscosity of nylon 6 by a factor of about 2, and for lithium bromide the melt viscosity is reported in the art to increase by a factor of about 10. Thus, the effect of such salts on the melt viscosity behavior of polyphthalamides is directly opposite that observed for aliphatic nylons, and is surprising.

In conducting melt spinning operations, a filter pack such as a sandpack is conventionally employed to remove particulate matter and gel from the molten resin prior to spinning. In the following examples, polyphthalamide resin formulations were melt spun using conventional melt spinning equipment fitted with a sand pack, and the increase in the pack pressure over a period of two hours is compared.

Example 5 and Comparison Example B.

Polyphthalamide I and 0.5 wt % of lithium bromide were dry-blended, extrusion compounded and melt-spun using a 1 inch, single-screw extruder fitted with a medium compression ratio screw and a four-hole die with 2.8 mm diameter holes. The extruder zone temperatures during the extrusion ranged generally from 300° to about 325° C., with a melt temperature of about 325° C. and a die temperature of 310° C. Temperatures varied slightly, depending upon the melting point of the particular polyphthalamide being processed. The throughput was 72 cc/min. The four filaments were drawn in three stages using air oven temperatures of 380° F., 430° F. and 500° F., giving a draw ratio of 4.08. The final filament diameters were about 0.6 mm.

For comparison purposes, polyphthalamide resin alone was melt spun with the same equipment and under substantially the same conditions to provide Comparison Example B.

The more important consideration is that a stable pack pressure be established to control variation in spinning conditions, thereby producing a more uniform fiber. It will be seen that the pack pressure of the formulation containing the lithium bromide, Example 5, was substantially stable, increasing by only about 100 psi after some 2 hours of operation. For the control formulation, Example B, pack pressure increased over time, matching that of Example 6 after about 1 hour, and increasing by as much as 560 psi after 100 minutes of operation, reaching levels well beyond that of Example 5.

The addition of a copper stabilizer to a polyphthalamide affords substantial improvement in thermal stability. In each of the following examples the indicated polyphthalamide formulation with varying levels of a functicalized high density polyethylene (HDPE-f) was melt spun and the thermal stabilities of the filaments of Examples 6–22 and Control Examples C–F were determined by tensile testing of fiber samples after aging in an air oven at 350° F. for periods of from 1 to 28 days. The compositions and test data are summarized in Table III.

TABLE III

350° F. Heat Stability of Filaments Comprising
Polyphthalamide, CuI/KI Stabilizer and Functionalized HDPE Synergist

| Ex No | Resin | Salt | wt % | HDPE-f wt % | Initial T g/den | % Tenacity retained, days | | | | | |
|---|---|---|---|---|---|---|---|---|---|---|---|
| | | | | | | 4 | 7 | 10 | 14 | 17 | 21 |
| C | PPA-1 | LiBr | 0 | 0 | 4.69 | 78 | 44 | 37 | 23 | 18 | 15 |
| 7 | PPA-1 | LiBr | 0.5 | 0 | 5.18 | 87 | 73 | 76 | 70 | 66 | 57 |
| D | PPA-1 | LiBr | 0 | 3.8 | 4.75 | 96 | 84 | 73 | 64 | 58 | 49 |
| 8 | PPA-1 | LiBr | 0.2 | 3.8 | 4.44 | 92 | 86 | 73 | 80 | 76 | 52 |
| 9 | PPA-1 | LiBr | 0.5 | 3.8 | 3.77 | 90 | 88 | 82 | 81 | 75 | 74 |
| E | PPA-2 | LiBr | 0 | 3.8 | 3.27 | 98 | 93 | 88 | 84 | 67 | 38 |
| 10 | PPA-2 | LiBr | 0.5 | 3.8 | 3.32 | 100 | 95 | 93 | 90 | 80 | 82 |
| F | PPA-3 | LiBr | 0 | 3.8 | 4.67 | 84 | 77 | 77 | 74 | 70 | 64 |
| 11 | PPA-3 | LiBr | 0.5 | 3.8 | 4.38 | 87 | 80 | 78 | 73 | 70 | 67 |
| 12 | PPA-1 | LiBr | 0.5 | 3.8 | 4.22 | 98 | 94 | 90 | 86 | 80 | 72 |
| 13 | PPA-1 | LiCl | 0.24 | 3.8 | 4.16 | 100 | 96 | 88 | 93 | 79 | 80 |
| 14 | PPA-1 | LiI | 0.77 | 3.8 | 4.22 | 97 | 82 | 75 | 75 | 70 | 62 |
| 15 | PPA-1 | NaCl | 0.34 | 3.8 | 3.64 | 103 | 97 | 97 | 95 | 87 | 76 |
| 16 | PPA-1 | NaBr | 0.60 | 3.8 | 3.92 | 94 | 87 | 88 | 88 | 75 | 70 |
| 17 | PPA-1 | NaI | 0.86 | 3.8 | 4.26 | 93 | 83 | 82 | 71 | 64 | 71 |

Notes:
each polymer contains KI/Cu in a weight ratio of 10/1, giving a Cu concentration of 500 ppm, (see text), and 0.1 wt % magnesium stearate and 0.1 wt % PTFE.

TABLE II

| Ex. No.: | A | | 5 | |
| Resin (wt %): | PPA-1 | | PPA-1 | |
| LiBr (wt %): | 0 | | 0.5 | |
| time (min.) | P (psi) | Δ P (psi) | P (psi) | Δ P (psi) |
|---|---|---|---|---|
| 0 | 1250 | 0 | 1190 | 0 |
| 15 | — | — | 1250 | 60 |
| 30 | 1390 | 140 | 1280 | 90 |
| 45 | 1440 | 190 | 1240 | 50 |
| 50 | 1530 | 280 | — | — |
| 60 | — | — | 1250 | 60 |
| 65 | 1730 | 480 | — | — |
| 75 | 1810 | 560 | 1250 | 60 |
| 90 | 1830 | 580 | 1280 | 90 |
| 100 | 1900 | 650 | 1290 | 100 |

It will be apparent from these data that copper stabilizers alone are ineffective in stabilizing polyphthalamides during melt extrusion, Control C. The addition of a polyolefin provides a synergistic enhancement of stability, Control D. However, the further addition of LiBr, either without the polyolefin synergist, Example 7, or with the synergist, Examples 9 and 10, further improves thermal stability. The improvement is also seen for other polyphthalamides, compare Example 10 and Control E, and for other alkali metals, see Examples 11–17. However, the improvement in thermal stability realized by adding the alkali metal halide may not be significant for all polyphthalamide resins for formulations containing a polyolefin synergist. See Control F and Example 11.

The invention will thus be seen to be a method for lowering the melt viscosity of polyphthalamide resins comprising compounding the polyphthalamide with an amount of an alkali metal halide sufficient to reduce the melt viscosity of the polyphthalamide, preferably from 0.1 to about 2 wt % of an alkali metal halide, and polyphthalamide resin formulations having a lower melt viscosity at temperatures normally encountered in melt processing operations comprising from about 99.9 to about 98 wt % polyphthalamide and, correspondingly, from about 0.1 to about 2 wt % alkali metal halide. Polyphthalamide resin formulations according to the inventions may be further compounded with a copper iodide/potassium iodide thermal stabilizer, optionally including a polyolefin synergist, to provide compositions with improved thermal stability, particularly suited for producing melt spun polyphthalamide fiber for use in environments where extended exposure to elevated temperatures is contemplated.

Although the invention has been described and illustrated by way of specific embodiments set forth herein, still further modifications and variations will be readily apparent to those skilled in the resin formulating and composite fabricating art. For example, melt extrusion of thin film, particularly film intended for use in providing slit film as the staple fiber in forming yarn, tow or woven textile or the like, is subject to many of the same considerations as the melt spinning of filament. Filled polyphthalamide formulations containing mineral fillers or fiber reinforcement such as glass fiber or carbon fiber or the like are particularly difficult to process, and the addition of alkali metal halides to reduce the melt viscosity according to the invention may provide significant improvement in processability. It will be further apparent that heat and light stabilizers, pigments, dyes, lubricants, processing aids and the like may also be employed in formulating the improved resins of this invention according to the common practice of the resin compounding art. These and other such variations and modifications are also contemplated as lying within the scope of the invention, which will be solely defined by the appended claims.

I claim:

1. A polyphthalamide composition comprising a polyphthalamide and from about 0.1 to about 2.0 wt % of an lithium halide, based on combined weight of said polyphthalamide and said lithium halide.

2. The composition of Claim 1 wherein the lithium halide is selected from the group consisting of lithium chloride and lithium bromide.

3. The composition of Claim 1 wherein said polyphthalamide comprises at least 50 mole % terephthalamide units represented by the structure:

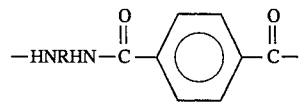

wherein R comprises at least one aliphatic hydrocarbyl radical having from about 4 to about 14 carbon atoms.

4. The composition of Claim 1 wherein said polyphthalamide comprises units represented by the structure:

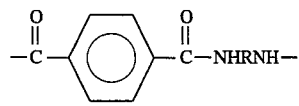 A

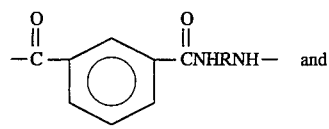 B

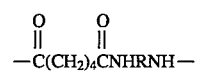 C wherein R comprises at least one aliphatic hydrocarbyl radical.

5. The composition of Claim 4 wherein the mole ratio of units A:B:C is in the range of from 100–50:0–35:0–50.

6. A method for reducing the melt viscosity of a polyphthalamide resin comprising compounding said polyphthalamide resin with from 0.1 to about 2 wt % of an lithium halide, based on combined weight of said polyphthalamide and said lithium halide.

7. The method of Claim 2 wherein the halide is selected from the group consisting of chloride, and bromide.

8. The method of Claim 6 wherein said polyphthalamide comprises at least 50 mole % terephthalamide units represented by the structure:

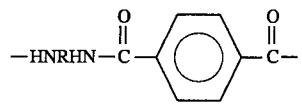

wherein R comprises at least one aliphatic hydrocarbyl radical having from about 4 to about 14 carbon atoms.

* * * * *